UNITED STATES PATENT OFFICE.

JAMES B. EATON, OF CENTERPOINT, TEXAS, ASSIGNOR OF ONE-HALF TO GEORGE BASS BLACKMAN, OF CHATTANOOGA, TENNESSEE.

MEDICATED SALT BRICK.

SPECIFICATION forming part of Letters Patent No. 721,633, dated February 24, 1903.

Application filed June 12, 1902. Serial No. 111,410. (No specimens.)

*To all whom it may concern:*

Be it known that I, JAMES B. EATON, a citizen of the United States, residing at Centerpoint, in the county of Kerr and State of Texas, have invented new and useful Improvements in Medicated Bricks for Live Stock, of which the following is a specification.

This invention relates to medicated bricks for live stock, and has for its object to provide an improved brick of the character referred to by means of which, while the stock obtain the necessary amount of salt to satisfy their natural craving, is also administered a medicinal preparation which operates to purify the blood, regulate all stomach troubles, cause a healthy action of the skin, expel worms from the stomach and intestines, and create a normal and healthy appetite.

Medicated salt rock intended to accomplish the objects above set forth has heretofore been in use. Such medicated salt rock was compounded of salt, cement, nitrate of potash, santonin, nux vomica, gentian, sulfate of iron, and sulfur. In making such salt rock the cement was mixed with a sufficient quantity of water to form a plastic mass, into which the other ingredients were stirred to produce a compound to harden into rock form, the cement being employed as a binder or adhesive agent. The compound was then put up in the form of blocks or cakes of suitable dimensions and was designed to be placed in the feed-boxes of the stock or places where the animals have been accustomed to be "salted." The cement used in the described medicated salt rock was of no benefit to the stock and was merely used as a binder for the other ingredients, and a great deal of water was required in mixing the salt and medicine with the cement, and after mixing the compound was placed in a wooden box and left to dry, during which operation the water came to the top, naturally carrying with it the medicine, leaving the cement at the bottom of the box, whereby after the rock had become hardened the bottom of the block was practically useless, only the upper side thereof containing the medicine. Furthermore, with such composition the cement hardened in the course of a few weeks to such an extent that it would honeycomb when licked by the stock and would soon become so hard that the stock would be forced to bite or crush it with their teeth rather than lick it, as intended.

According to my present invention the formula used for my improved medicated brick is as follows: Liverpool evaporated salt, sixty-five pounds eight ounces; clay, (such as hereinafter described,) thirty pounds; sulfur, two pounds; saltpeter, one pound; copperas, one pound; nux vomica, (powdered,) six ounces; santonin, two ounces.

The clay is mixed with water, and the other ingredients are stirred in with the clay and intimately mixed therewith. The mixture is then molded into shape and placed in a press and given approximately four thousand five hundred pounds pressure to each brick. The bricks are then placed in a dry-kiln and kept there, say, for about forty-eight hours and are then ready for use.

The clay employed for the purpose is found in the immediate vicinity of Bainbridge, in the county of Decatur and State of Georgia, and is known in that vicinity as "Indian pipe-clay." An analysis of this clay discloses the presence of aluminium, iron, silica, magnesia, lime, and traces of potash. This clay contains no gravel, grit, or grain of any kind and requires only six quarts of water to mix thirty pounds of it to form one hundred pounds of the compound. By employing this clay instead of the cement, as set forth in the Letters Patent heretofore referred to, the medicine is distributed evenly throughout the entire brick. While the cement used in the said former patent is of no benefit to the stock, being simply employed as a binder, the clay referred to in the present invention has been found in practice to be of a decided benefit to the stock.

The bricks formed of my improved compound herein described never become harder than when taken from the kiln, will always yield to the moisture of the animal's tongue, and atmospheric changes have no effect whatsoever upon it. By means of my improved brick the animal gets the medicine and salt in the exact proportions that is most beneficial for it. The brick is to be used as a medicinal preparation for all kinds of live stock and should be placed in the animal's feed-box or in the vicinity of the place where the animal is usually salted or watered. It not only furnishes the necessary amount of salt to the animal, but also administers the medicinal materials mentioned that operate to purify the blood, regulate the stomach troubles, cause a healthy action of the skin, expel worms from the stomach and intestines, and create a normal and healthy appetite. The stock licking the brick tastes nothing but the salt and clay, but at the same time takes the proper quantity of medicinal materials mentioned.

Having described my invention, what I claim is—

1. The herein-described medicated brick for live stock consisting of salt, clay possessing the characteristics described, and medicinal materials, all intimately mixed and dried to form a block, as set forth.

2. The herein-described medicated brick for live stock, the same consisting of salt, clay, sulfur, saltpeter, copperas, nux vomica and santonin, in approximately the proportions specified, and all intimately mixed and hardened into block form, as set forth.

In testimony whereof I have hereunto set my hand in presence of two subscribing witnesses.

JAMES B. EATON.

Witnesses:
A. W. FORDHAM,
R. W. TURNER.